(12) United States Patent
Ikeno et al.

(10) Patent No.: US 8,910,042 B2
(45) Date of Patent: Dec. 9, 2014

(54) IMAGE PROCESSING APPARATUS AND COMPUTER PROGRAM PRODUCT

(75) Inventors: Takahiro Ikeno, Seto (JP); Koshi Fukazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 884 days.

(21) Appl. No.: 11/753,495

(22) Filed: May 24, 2007

(65) Prior Publication Data

US 2007/0279717 A1 Dec. 6, 2007

(30) Foreign Application Priority Data

May 30, 2006 (JP) .................................. 2006-149845

(51) Int. Cl.
*G06F 3/048* (2013.01)
*H04N 1/387* (2006.01)

(52) U.S. Cl.
CPC ................. *H04N 1/3873* (2013.01)
USPC ........................... 715/273; 715/274; 715/277

(58) Field of Classification Search
CPC .... G06F 3/048; G06F 3/0484; G06F 3/04842
USPC ................... 358/538, 400; 715/273, 274, 277
See application file for complete search history.

(56) References Cited

U.S. PATENT DOCUMENTS

| | | | | |
|---|---|---|---|---|
| 5,677,708 | A * | 10/1997 | Matthews et al. | 348/E5.104 |
| 6,388,684 | B1 * | 5/2002 | Iwamura et al. | 715/788 |
| 7,064,858 | B2 * | 6/2006 | Iwai et al. | 358/1.2 |
| 7,559,024 | B2 * | 7/2009 | Mori et al. | 715/273 |
| 7,600,192 | B1 * | 10/2009 | Hashimoto et al. | 715/802 |
| 7,937,726 | B2 * | 5/2011 | Nashida et al. | 725/46 |
| 2002/0191867 | A1 * | 12/2002 | Le et al. | 382/300 |
| 2003/0117407 | A1 * | 6/2003 | Minami | 345/555 |
| 2003/0231322 | A1 * | 12/2003 | Sumiuchi | 358/1.2 |

(Continued)

FOREIGN PATENT DOCUMENTS

| | | |
|---|---|---|
| JP | H05-012396 A | 1/1993 |
| JP | H05-048877 A | 2/1993 |

(Continued)

OTHER PUBLICATIONS

State Intellectual Property Office of the People's Republic of China; Notification of First Office Action in Chinese Patent Application No. 200710108135.X mailed Jun. 5, 2009.

(Continued)

*Primary Examiner* — Daeho Song
(74) *Attorney, Agent, or Firm* — Baker Botts L.L.P.

(57) ABSTRACT

An image processing apparatus includes an indicator display unit that displays an indicator for specifying a selection region. The selection region has a quadrilateral shape defined by a third pair of parallel sides and a fourth pair of parallel sides, which are substantially in parallel with a first pair of parallel sides and a second pair of parallel sides of an image displayed on a display screen, respectively. The indicator indicates positions of the third pair and movably displayed in parallel with the second while the parallel sides of the third pair are retained at a predetermined distance. A position of the third pair is determined in accordance with a decided position of the indicator, and a position of the fourth pair is determined to substantially coincide with the second pair of the image. Image data corresponding to the determined selection region is selected as selected image data.

16 Claims, 9 Drawing Sheets

(56) References Cited

U.S. PATENT DOCUMENTS

| | | | |
|---|---|---|---|
| 2004/0046796 A1* | 3/2004 | Fujita | 345/767 |
| 2004/0056880 A1* | 3/2004 | Matsuoka et al. | 345/716 |
| 2004/0111675 A1* | 6/2004 | Mori et al. | 715/513 |
| 2005/0060656 A1* | 3/2005 | Martinez et al. | 715/751 |
| 2005/0062991 A1* | 3/2005 | Fujishige et al. | 358/1.9 |
| 2005/0088694 A1* | 4/2005 | Ogiwara | 358/1.18 |
| 2006/0093207 A1* | 5/2006 | Reicher et al. | 382/156 |
| 2006/0228020 A1* | 10/2006 | Sakai | 382/162 |
| 2006/0236349 A1* | 10/2006 | Lee | 725/80 |
| 2007/0229922 A1* | 10/2007 | Hattori | 358/501 |

FOREIGN PATENT DOCUMENTS

| | | |
|---|---|---|
| JP | H05-153366 A | 6/1993 |
| JP | H05-063160 U | 8/1993 |
| JP | H09-016796 A | 1/1997 |
| JP | H11-177802 A | 7/1999 |
| JP | 2000-216959 A | 8/2000 |
| JP | 2003-244586 A | 8/2003 |
| JP | 2004-009335 A | 1/2004 |

OTHER PUBLICATIONS

Japan Patent Office, Notification of Reasons for Refusal for Japanese Patent Application No. 2006-149845, dispatched Dec. 14, 2010.

Patent Reexamination Board of the Chinese Patent Office, Notification of Reexamination for Chinese Patent Application No. 200710108135.X, issued Dec. 8, 2011.

* cited by examiner

DISPLAY OF OVERALL TRIMMING
REGION CONFIRMATION AREA

ENLARGED DISPLAY OF TRIMMING
REGION CONFIRMATION AREA

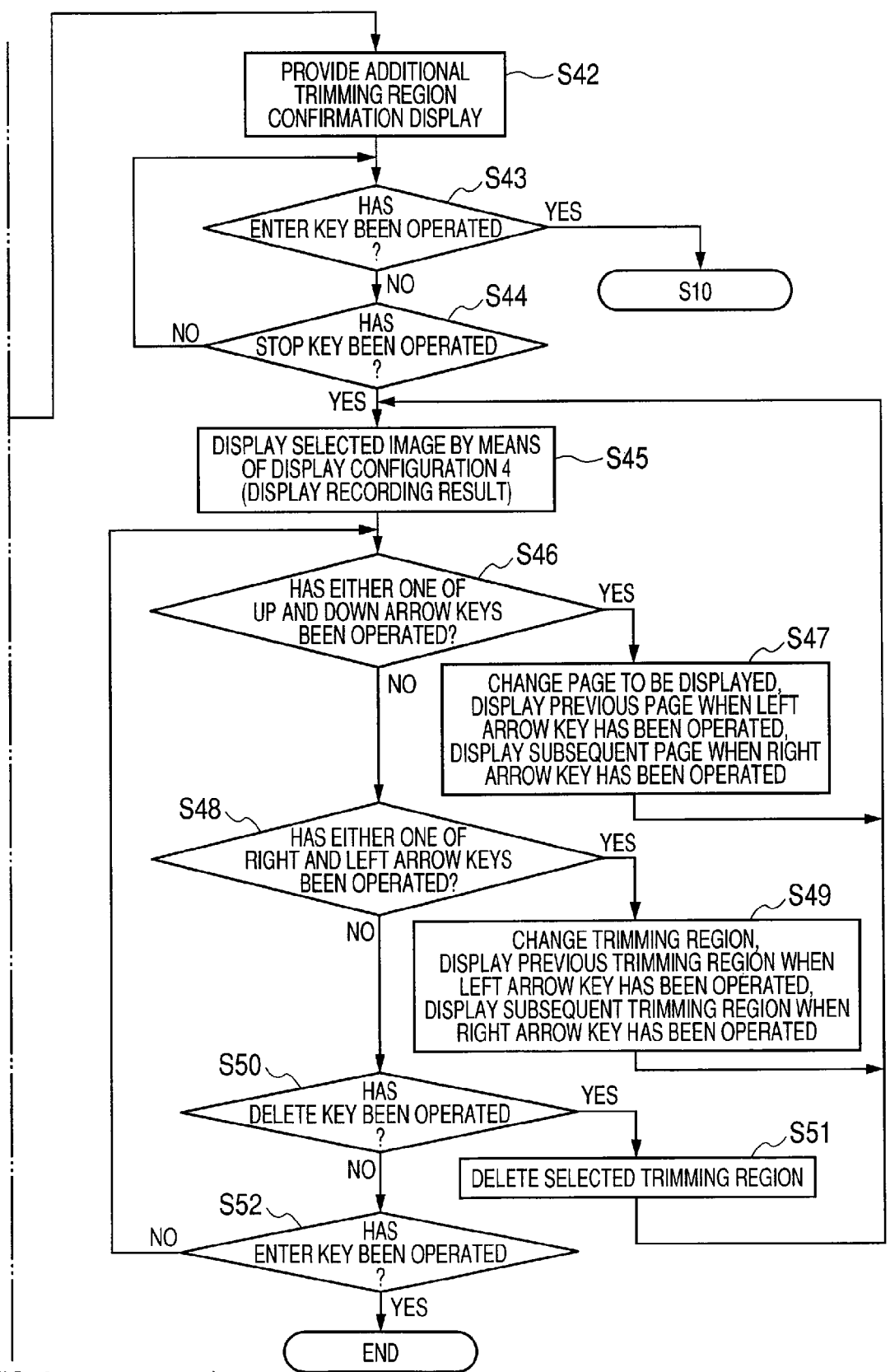
(FIG. 6 CONTINUED)

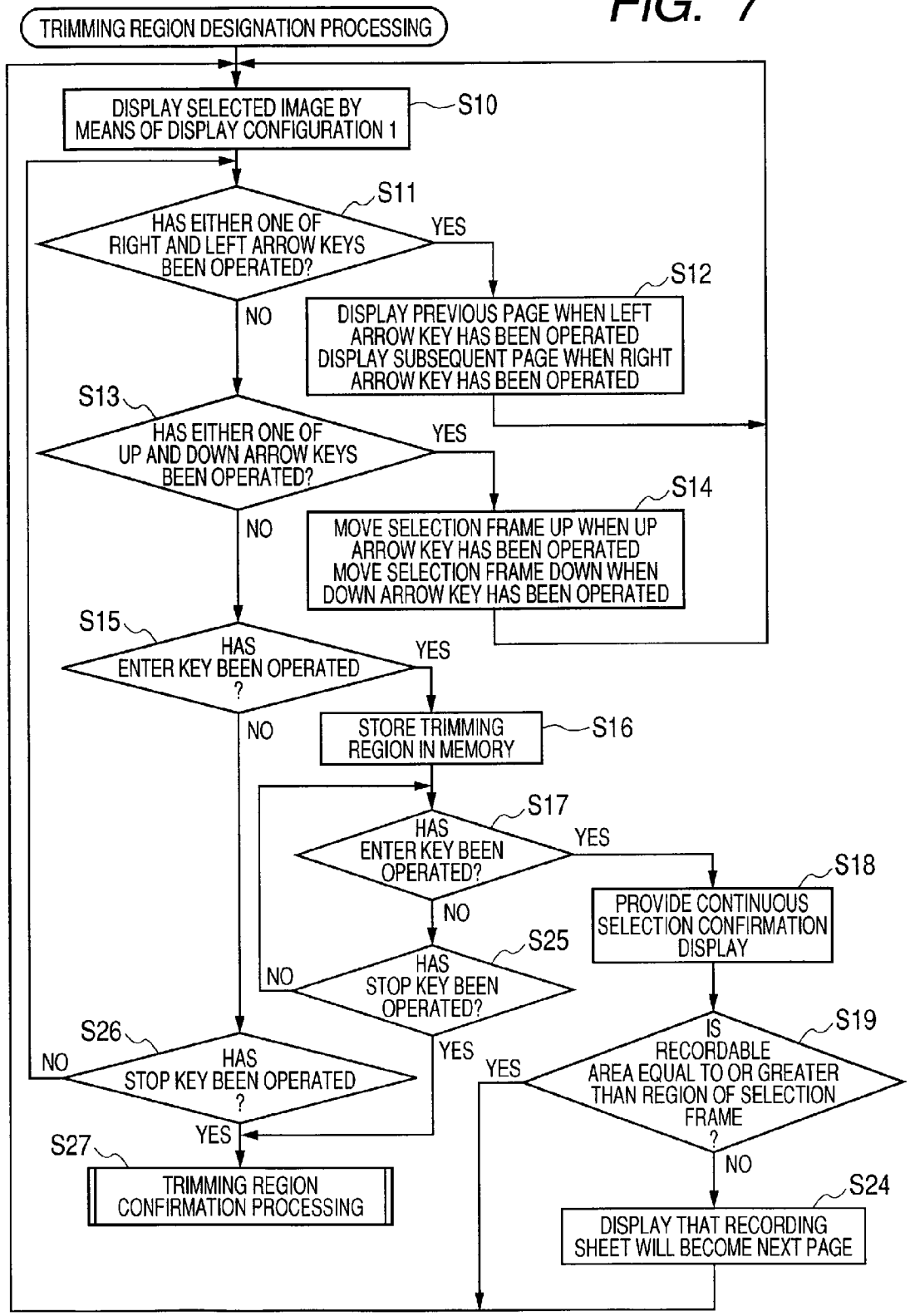

IMAGE PROCESSING APPARATUS AND COMPUTER PROGRAM PRODUCT

CROSS-REFERENCE TO RELATED APPLICATIONS

This application is based upon and claims the benefit of priority from Japanese Patent Application No. 2006-149845, filed on May 30, 2006, the entire contents of which are incorporated herein by reference.

TECHNICAL FIELD

The present invention relates to an image processing apparatus and a computer program product for enabling a computer to process an image.

BACKGROUND

There is an image processing apparatus for printing image data on a predetermined recording medium. Also there is an image processing apparatus for transmitting and receiving image data over a communications line through facsimile transmission.

JP-U-5-63160 discloses a facsimile machine capable of displaying a reduced image of one page of a document received via facsimile on a display unit; specifying a part of the reduced image by means of a mouse; and displaying an enlarged image of the part of the reduced image.

However, the facsimile machine requires a mouse for specifying an area on the reduced image. Therefore, an image processing apparatus, such as a facsimile or a printer, provided with no mouse encounters difficulty in specifying the area.

SUMMARY

According to an aspect of the invention, there is provided an image processing apparatus comprising: a key operation unit having a plurality of keys; a display screen; an image storage unit that stores image data; an image display unit configured to display at least a part of an image that is based on the image data stored in the image storage unit, the image having a quadrilateral shape defined by a first pair of parallel sides and a second pair of parallel sides; an indicator display unit configured to display an indicator for specifying a selection region with respect to the image displayed on the display screen, the selection region having a quadrilateral shape defined by a third pair of parallel sides and a fourth pair of parallel sides, the third pair and the fourth pair being substantially in parallel with the first pair and the second pair, respectively, the indicator indicating positions of the parallel sides of the third pair, and the indicator display unit configured to movably display the indicator in a direction parallel to the second pair of parallel sides based on an input entered from the key operation unit while the parallel sides of the third pair are retained at a predetermined distance; a deciding unit configured to decide the position of the indicator displayed by the indicator display unit for determining a position of the selection region; a selection unit configured to determine a position the third pair in accordance with the decided position of the indicator and a position of the fourth pair to substantially coincide with the second pair of the image and configured to select image data corresponding to the determined selection region as selected image data; a selected image storage unit that stores the selected image data; and a storage control unit configured to control the selected image data so as to be stored in the selected image data storage unit.

According to an another aspect of the invention, there is provided a computer program product for enabling a computer to control an image processing apparatus including a key operation unit having a plurality of keys, a display screen, and an image storage unit that stores image data, the program product comprising: software instructions for enabling the computer to perform an image processing, and a computer readable medium bearing the software instructions, the image processing operation including the steps of: displaying at least a part of an image that is based on the image data stored in the image storage unit on the display screen, the image having a quadrilateral shape defined by a first pair of parallel sides and a second pair of parallel sides; displaying indicators for specifying a selection region with respect to the image displayed on the display screen, the selection region having a quadrilateral shape defined by a third pair of parallel sides and a fourth pair of parallel sides, the third pair and the fourth pair being substantially in parallel with the first pair and the second pair, respectively, the indicator indicating positions of the parallel sides of the third pair, and movably displaying the indicator in a direction parallel to the second pair of parallel sides based on a input entered from the key operation unit while the parallel sides of the third pair are retained at a predetermined distance; deciding the position of the indicator displayed on the display screen; determining a position of the third pair in accordance with the decided position of the indicator and a position of the fourth pair to substantially coincide with the second pair of the image, and selecting image data corresponding to the determined selection region as selected image data; and storing the selected image data into the selected image data storage unit.

BRIEF DESCRIPTION OF THE DRAWINGS

FIG. 7 is a flowchart showing trimming region designation processing in a second embodiment.

DESCRIPTION

Figure 1:
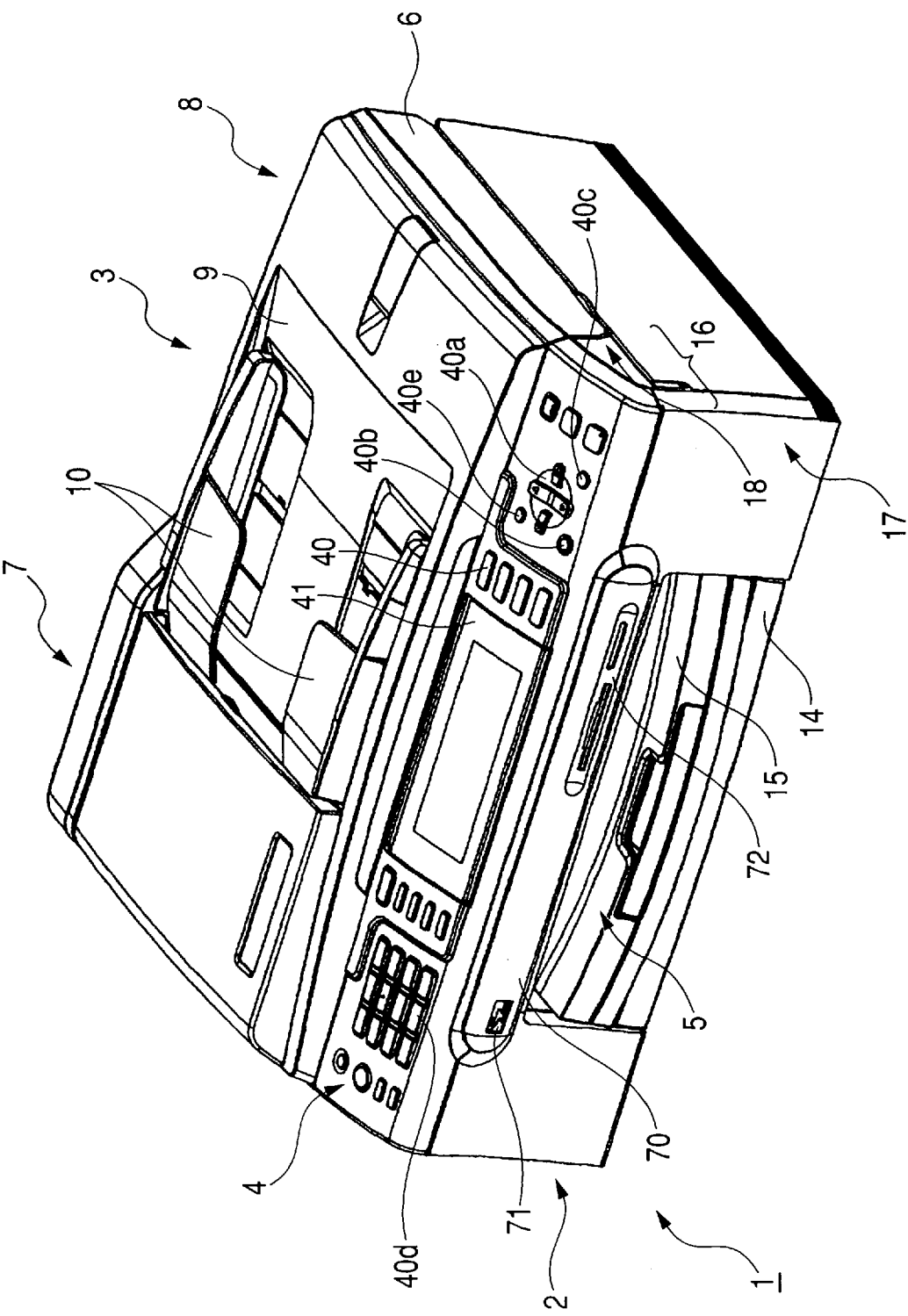
FIG. 1 is a perspective view showing the external view of a multifunction peripheral device including an image processing apparatus according to a first embodiment of the present invention.

A first embodiment of the present invention will be described below with reference to the accompanying drawings. FIG. 1 is a perspective view showing the external configuration of a multi function peripheral or multi function printer (hereinafter abbreviated as an "MFP") 1 of the embodiment of the present invention. As shown in FIG. 1, the MFP 1 integrally comprises a printer unit 2 provided in a lower portion; a scanner unit 3 provided in an upper portion; and a control panel 4 provided at the front side of the scanner unit 3. The MFP 1 also has a printer function, a scanner function, a copier function, and a facsimile function.

The MFP 1 is connectable to a computer (not shown) and can record an image or a document on a recording sheet (a recording medium) in accordance with image data or document data transmitted from the computer. When being connected to an external device such as a digital camera etc, the MFP 1 can record on the recording sheet image data output from the external device. When various storage mediums such as a memory card etc. are inserted into the MFP 1, data such as image data stored in the storage medium can be recorded on a recording sheet. Needless to say, the MFP 1 can record an image on any recording medium such a transparent sheet film for OHP purpose, a cloth (which are examples of a recording medium), etc.

In the scanner unit 3, a document cover 8 having an automatic document conveying mechanism (hereinafter also called ADF (Automatic Document Feeder)) 7 is attached to a document reading table 6 serving as an FBS (Flatbed Scanner) so as to be freely opened and closed with a hinge provided as a fulcrum on the back of the document cover 8.

An upper surface of the document reading table 6 is opened wide when the cover is opened, and platen glass is fitted into the opened area. The document reading table 6 has therein spaces, such as a space for storing an image reading unit, a space for movement of an image reading unit, a space for the image reading unit, a space for a member that supports the image reading unit, a space for a mechanism that drives the image reading unit, etc.

The ADF 7 conveys a document from a document tray 9 to a document ejection tray 10 by way of a document transport passage. The printer unit 2 includes an inkjet-type image recording apparatus (an inkjet printer). The inkjet printer selectively squirts ink droplets, in accordance with the image data read by the scanner unit 3 or the image data input from the outside to record an image on a recording sheet. As mentioned above, the printer unit 2 is disposed beneath the scanner unit 3.

An opening portion 5 is formed in the front side of the MFP 1; in other words, the front side of the printer unit 2. A sheet feeding tray 14 and a sheet ejection tray 15 are disposed so as to be completely contained in this opening portion 5. The sheet feeding tray 14 and the sheet ejection tray 15 are disposed so as to be stacked in two layers; namely, the sheet ejection tray 15 is provided in an upper layer, and the sheet feeding tray 14 is provided in a lower layer.

The control panel 4 is provided at the front side of the MFP 1. The control panel 4 is formed into an oblong shape shown in FIG. 1 so as to fit with an unoccupied space on a protruding portion 16. Put another way, a depth dimension of the control panel 4 is set so as to fit with a length (a depth dimension of the open space) determined by subtracting the depth dimension of the scanner unit 3 from the depth dimension of the printer unit 2. The control panel 4 is provided for operating the printer unit 2 and the scanner unit 3 and includes various operation keys 40 and a liquid crystal display (LCD) unit 41 that includes a display screen. This display screen has an aspect ratio of 3:8 achieved by arranging two screens each having an aspect ratio of 3:4 side by side.

A user can input a desired command by use of the control panel 4. When a predetermined command is input to the MFP 1, a control unit 20 controls operation of the MFP 1 pursuant to the input information. The operation keys 40 provided in the control panel 4 include: a cross-shaped key 40*a* enabling designation any one of up, down, right and left directions; an ENTER key 40*b* for mainly instructing determination of operation; a stop key 40*c* for mainly instructing stoppage of processing; a ten-key 40*d* which is positioned on the left side of the display screen and used for inputting numerals 0 to 9; and a delete key 40*e* for instructing deletion of selected image data stored in a selected image memory 23*b* (see FIG. 2) of RAM 23.

The MFP 1 includes a system configuration so as to operable based on a command transmitted from a computer by way of a printer driver, a scanner driver, etc., upon connection with the computer, in addition to a command input from the control panel 4.

A connection panel 70 is provided at a position above the opening 5 of the printer unit 2. A USB port 71 is provided in a left-side area of this connection panel 70. The USB port 71 is a connecter terminal that is connectable with an external device to allow communication between the MFP 1 and the external device. Moreover, a slot unit 72 is provided at a position on the right side of the connection panel 70. The slot unit 72 includes a plurality of card slots that enables to receive insertion of the card-type memory device. When a card-type memory device is inserted into any of the card slots and a control unit 20 (described later) reads image data from the inserted card memory, the control unit 20 displays the read image data and information regarding the read image data on the display screen. Alternatively, the printer unit 2 records a selected arbitrary image on a recording sheet.

Figure 2:
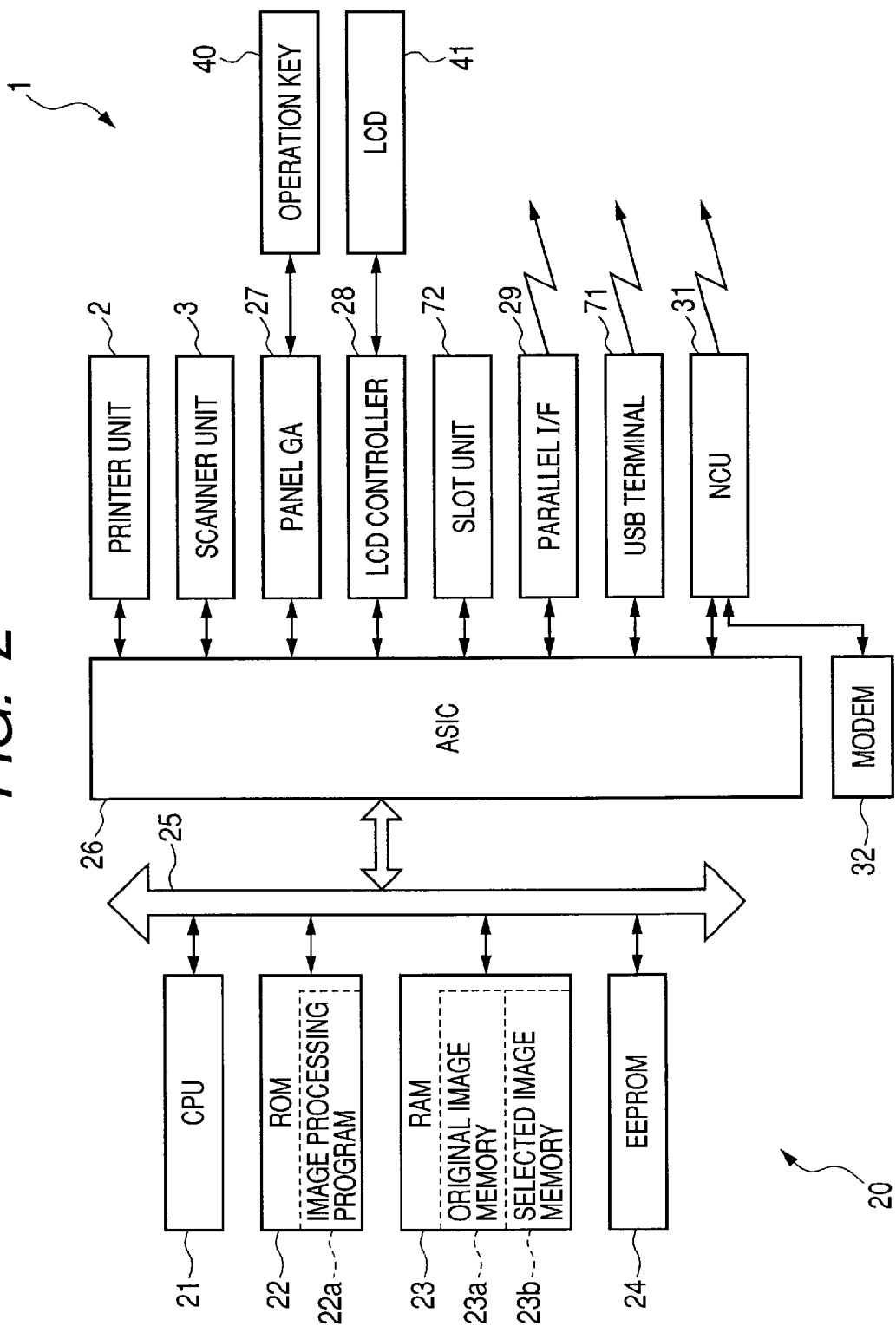
FIG. 2 is a block diagram showing an electrical configuration of the multifunction peripheral device.

With reference to FIG. 2, a brief explanation is now given to the electrical configuration of the MFP 1. FIG. 2 is a block diagram showing the electrical configuration of the MFP 1. The control unit 20 collectively controls operation of the MFP 1 including the printer unit 2, the scanner unit 3 and the control panel 4. As shown in FIG. 2, the control unit 20 is configured in the form of a microcomputer mainly including a CPU (Central Processing Unit) 21, ROM (Read-Only Memory) 22, the RAM (Random-Access Memory) 23 and EEPROM (Electrically Erasable-and-Programmable ROM) 24. The control unit 20 is connected to an ASIC (Application-Specific Integrated Circuit) 26 by way of a bus 25.

The ROM 22 stores various control programs such as a program for controlling the facsimile function, the copier function, the scanner function, a trimming function etc. The ROM 22 also stores constants, tables and the like, which are used for the control programs. When an image is displayed on the display screen, display operation is performed in accordance with a display configuration indicating the display mode of an image, a scaling factor, a display location on the display screen and the like. A plurality of display configurations are stored in the ROM 22. The display configurations will be described with reference to FIG. 3.

The RAM 23 allows random access and temporally stores a variable or a parameter when the CPU 21 performs various functions. This RAM 23 includes: an original image memory 23*a* for storing original image data at the time of edition of an image; and selected image memory 23*b* stores image data corresponding to selected image that is selected as a partial image from the original image according to a selection operation. The selection operation can be performed repeatedly; and the image data selected this time are stored subsequently to previously selected image data.

The image processing program stored in the ROM 22 is programmed to: store image data (original image data) to be edited into the original image memory 23*a* provided in the RAM 23; to extract a portion or the entirety of the original image data; and to display an image originating from the extracted image data on the display screen, in response to the user's operation of the operation keys 40. Moreover, the image processing program is programmed to perform, in response to the user's operation of the operation keys 40, processing such as defining a region on the displayed image and storing image data corresponding to an image falling within the region into the selected image memory 23b provided in the RAM 23. The image processing program may be provided as a computer program product for enabling a computer to control an image processing apparatus includes software instructions for enabling the computer to perform an image processing, and a computer readable medium bearing the software instructions. The computer readable medium may be a CD-ROM, Hard Disk, etc.

Pursuant to the command from the CPU 21, the ASIC 26 controls operations of the printer unit 2, the scanner unit 3, the control panel 4 and the slot unit 72. Detailed explanations of the printer unit 2, the scanner unit 3 and the slot unit 72 are omitted. However, the control unit 20 controls operation of a motor for driving the printer unit 2, operation of an inkjet recording head, operation of a motor for driving the scanner unit 3, operation of an image reading unit, and the like.

The ASIC 26 is connected to a panel gate array 27 which controls the operation keys 40 by way of which a desired command is input to the MFP 1. The panel gate array 27 detects depression of any of the operation keys 40 and outputs a predetermined code signal. The key codes are assigned to the plurality of operation keys 40, respectively. Upon receipt of a predetermined key code from the panel gate array 27, the CPU 21 performs control processing to be executed in accordance with a predetermined key processing table. The key processing table includes key codes and corresponding control processing operations associated with each other and is stored in, e.g., the ROM 22.

The ASIC 26 is connected to an LCD controller 28 that controls a display screen of the liquid crystal display unit 41. Pursuant to a command from the CPU 21, the LCD controller 28 displays, on the screen of the liquid crystal display unit 41, information about operation of the printer unit 2 or scanner unit 3, a read image or an input image.

The CPU 21 stores information to be displayed on a display screen of the liquid crystal display unit 41 into display memory devices (not shown). The display memory devices correspond to the primary colors R, G and B, respectively.

The liquid crystal display unit 41 includes matrix switches (not shown) allocated to the respective primary colors R, G and B. When electric charges are applied to the matrix switch, liquid crystal molecules located immediately below the matrix switch are aligned in a direction for permitting transmission of light. As a result, any one color of R, G, and B is displayed on the liquid crystal display unit 41. Each of the matrix switches corresponds to one dot of any one color of R, G and B.

One bit of the display memory device corresponds to one of the matrix switches; namely, one bit of the display memory corresponds to one dot of any one color of R, G and B.

The LCD controller 28 reads RGB values stored in the display memory devices (not shown) at given periods through operation. A voltage is applied to a matrix switch corresponding to a bit assuming a value of one. Therefore, a display screen based on the information created by the CPU 21 is displayed on the liquid crystal display unit 41.

The ASIC 26 is connected to a parallel interface 29 and the USB terminal 71 for transmitting or receiving data to or from the computer by way of a parallel cable or a USB cable. Moreover, the ASIC 26 is connected to an NCU (Network Control Unit) 31 and a modem 32 which are for implementing the facsimile function.

The slot unit 72 includes a plurality of card slots which enable to receive insertion of card-type memory devices. When a card-type memory device is inserted into any one of the card slots and image data are read from the inserted card memory by the control unit 20 (described later), the control unit 20 displays the read image data and the information about the image data on the liquid crystal display unit 41. Alternatively, the printer unit 2 records an arbitrary selected image on a recording sheet.

A display configuration appearing of the display screen during trimming operation will now be described with reference to FIGS. 3A to 3E. FIGS. 3A to 3E show display configurations of the display screen displayed on the liquid crystal display unit 41. Any one of the display configurations shown in FIGS. 3A to 3E can be set by means of appropriate operation of the operation keys.

Figure 3A:
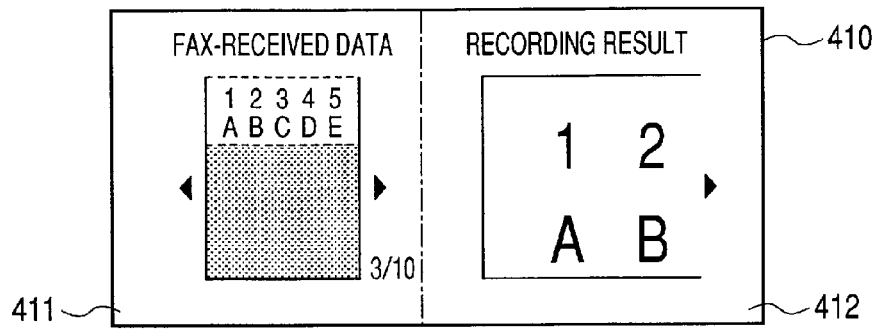
FIGS. 3A to 3E are screen diagrams showing display configurations.

FIG. 3A shows first display configuration 410. The first display configuration 410 includes a trimming region designation area 411 and trimming region confirmation area 412, which are created by dividing the rectangular (oblong) display screen into two sub-divisions along a parting line (a dashed-dotted line) which splits each of long sides into two. An image of one page based on the original image data is displayed in the trimming region designation area 411 disposed on a left side of the display screen. An image falling within a trimmed region is displayed in an enlarged manner in the trimming region confirmation area 412 disposed on a right side of the display screen.

In the present embodiment, a case where only a desired portion of the image data received by a facsimile is printed will be described as an example. In an example shown in FIG. 3A, the facsimile receives image data of ten pages (the received image data are stored as image data to be edited in the original image memory 23a in the RAM 23); image data are extracted on a per-page basis as a predetermined amount of the data (image data of the third page are extracted in FIG. 3A); and the extracted image data are displayed in the trimming region designation area 411. In these drawings, the third page is displayed in the trimming region designation area 411, and "12345" is horizontally written in the first line of the third page and "ABCDE" is also horizontally written in the second line of the third page. A display indication of 3/10 is provided at a lower right position with respect to the rectangular image of the third page, thereby showing that the third page out of a total of ten pages is currently displayed in the trimming region designation area 412.

In the page displayed in this trimming region designation area 411, the user can move a selection frame (an indicator) that defines a space of given size having a height between the upper and lower ends of a trimming region in a vertical (upper and lower) direction by means of operating the operation keys 40. Accordingly, a position of the selection frame can be set. In this drawing, a broken line located above the first row of "12345" corresponds to the upper end of the selection frame, and a broken line located below the second row of "ABCDE" corresponds to the lower end of the same. An image sandwiched between the upper and lower ends corresponds to a trimming region. The width of the selection frame is made equal to the horizontal width of a displayed image (a rectangular image displayed on the display screen in accordance with the image data extracted from the original image data). The height of the selection frame is determined so that the aspect ratio of the selection frame becomes equivalent to the aspect ratio of the display screen. As mentioned above, in the present embodiment, the aspect ratio of the display screen is 3:8, and therefore the height of the space between the upper and lower ends is 3/8 of the width of the displayed image. Hence, the distance between the upper and lower ends of the selection frame is set to be smaller than the height of the display screen. The width of the selection frame is not limited to the case where the width of the selection frame is precisely equal to the width of the displayed image. The width of the selection frame may also be set so that the selection frame is displayed to deviate inwardly or outwardly from the right and left ends of the displayed image. The essential requirement is to set the width of the selection frame to such an extent that the frame does not overlap characters on a displayed image, details of displayed graphics, or the like.

When the trimming region has been designated, a display mode for the area designated as the trimming region and a display mode for an area not designated as the trimming region are made different from each other. For instance, a background of the designated region is displayed in white, and a background of an area not being designated as the trimming region is displayed in gray. Alternatively, the designated region may be hatched so as to be distinguished from the area not designated as the trimming area.

When the position of the selection frame is set by means of the upper and lower ends, an image falling within the region of the selection frame is displayed in the trimming region confirmation area 412 and enlarged with a larger scaling factor than the image displayed in the trimming region designation area 411. An image displayed in the trimming region designation area 411 is hereinafter referred to as an "extracted image", a trimmed image displayed in the trimming region confirmation area 412 is hereinafter referred to as a "selected image"; and image data corresponding to the selected image are hereinafter referred to as "selected image data."

Figure 3B:
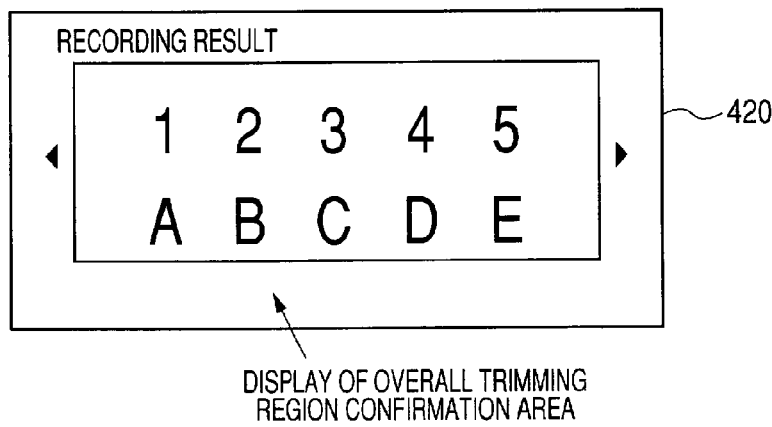

FIG. 3B shows a second display configuration 420, wherein only the selected image data based on the selected image data are displayed on the display screen. In the first display configuration 410 shown in FIG. 3A, the selected image is displayed in one of the divided display screens, and hence there arises a case where only a portion of the enlarged image is displayed. In the second display configuration 420, the selected image is displayed on the entire display screen, and hence the entire image of the selected image can be confirmed much better.

Figure 3C:
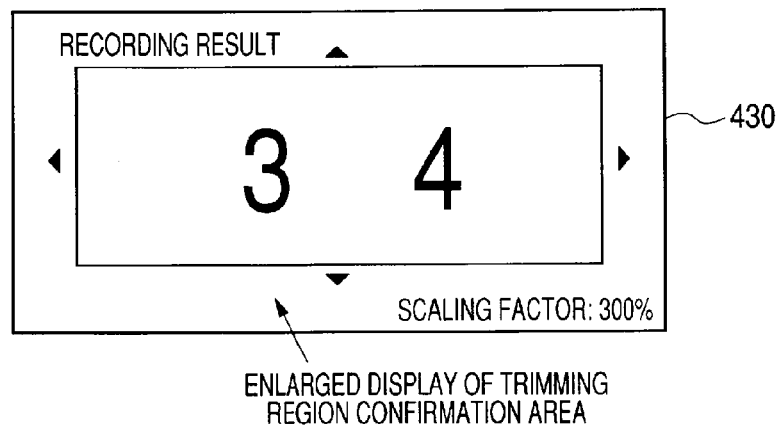

FIG. 3C shows a third display configuration 430, which shows a case where, in the state of the display configuration 420, i.e., when only the selected images remain displayed on the display screen, displaying is again performed by changing a display scaling factor. The display scaling factor is set by means of operation of an operation key such as the ten-key 40d, and the value of the set display scaling factor appears at a lower right position on the display screen. In the drawing, the selected image of the scaling factor 300% is displayed. Thus, not all of the selected images can be displayed simultaneously on the display screen in a enlarged display mode, but the display can be horizontally or vertically scrolled by means of operation of the cross-shaped key 40a.

Figure 3D:
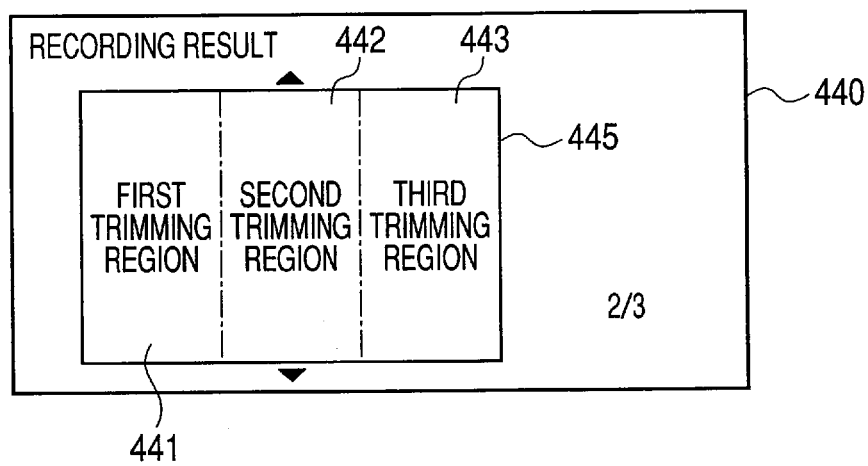

FIG. 3D shows a fourth display configuration 440. A plurality of selected images are stored in the selected image memory 23b through a plurality of trimming operations. Although these selected images can be printed by means of the printer unit 2, the size (A4-size, B5-size, etc.) of a recording sheet to be printed is designated by means of the printer unit 2. The size of a recording sheet may also be determined by the data received by the facsimile, or the user may also designate an arbitrary size.

In the fourth display configuration 440, the size of a recording sheet is designated as mentioned above, and the selected images to be printed on one page of a recording sheet are displayed in the form of images. Accordingly, the user can readily confirm the nature of a print result on a per-page basis.

In the example shown in FIG. 3D, an image 445 corresponding to the recording sheet is displayed so that the longitudinal direction of the recording sheet is brought in alignment with the longitudinal direction of the display screen. A first trimming region 441, a second trimming region 442 and a third trimming region 443 which are to be printed on a page of a recording sheet are displayed on the image 445 corresponding to the recording sheet. Moreover, 2/3 is displayed on the right side of the display screen. This "2/3" shows that the currently-displayed page corresponds to the second page of a total of three pages.

Figure 3E:
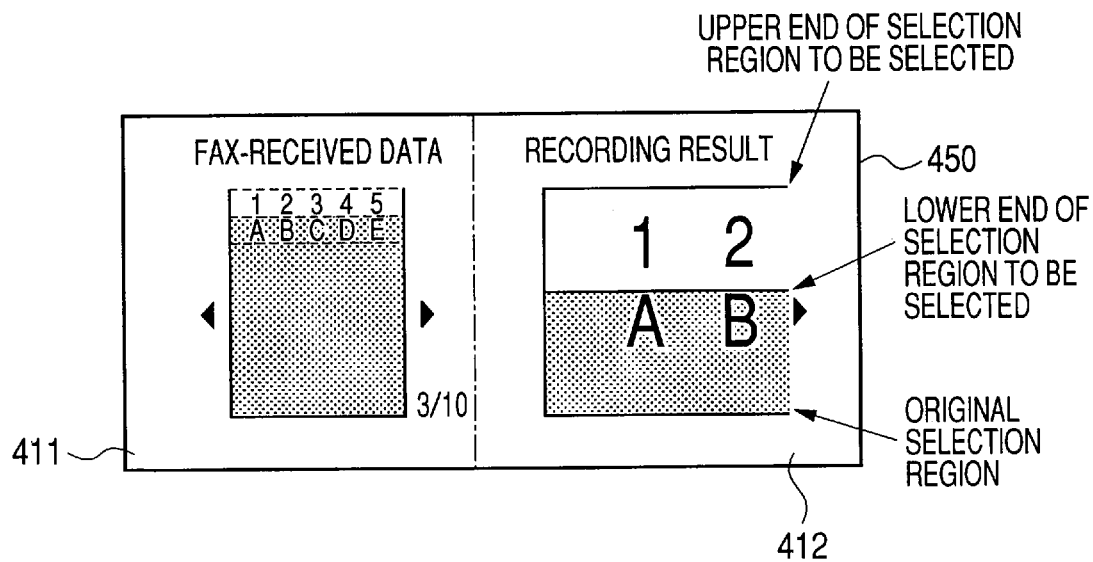

FIG. 3E shows a fifth display configuration 450. The fifth display configuration 450 shows a way to reduce the size of the selection frame. As mentioned previously, the selected image is printed on the recording sheet in numbers and in a linked manner. When the size of the selection frame does not depend on the size of the recording sheet, images selected by the next selection frame may fail to fall within the blank space of the page acquired as a result of printing of a plurality of selected images. In such a case, the vertical length of the selection frame is shortened and adjusted so that the images selected by the reduced selection frame fall within blank spaces.

The fifth display configuration 450 shows the state mentioned above, wherein images are selected by means of the selection frame whose length between the upper and lower ends has been shortened. As shown in FIG. 3E, it may also be possible to allow a selection between an original selection frame and a reduced sized selection frame, by means of displaying the original selection frame whose vertical length has not been changed.

Figure 4:
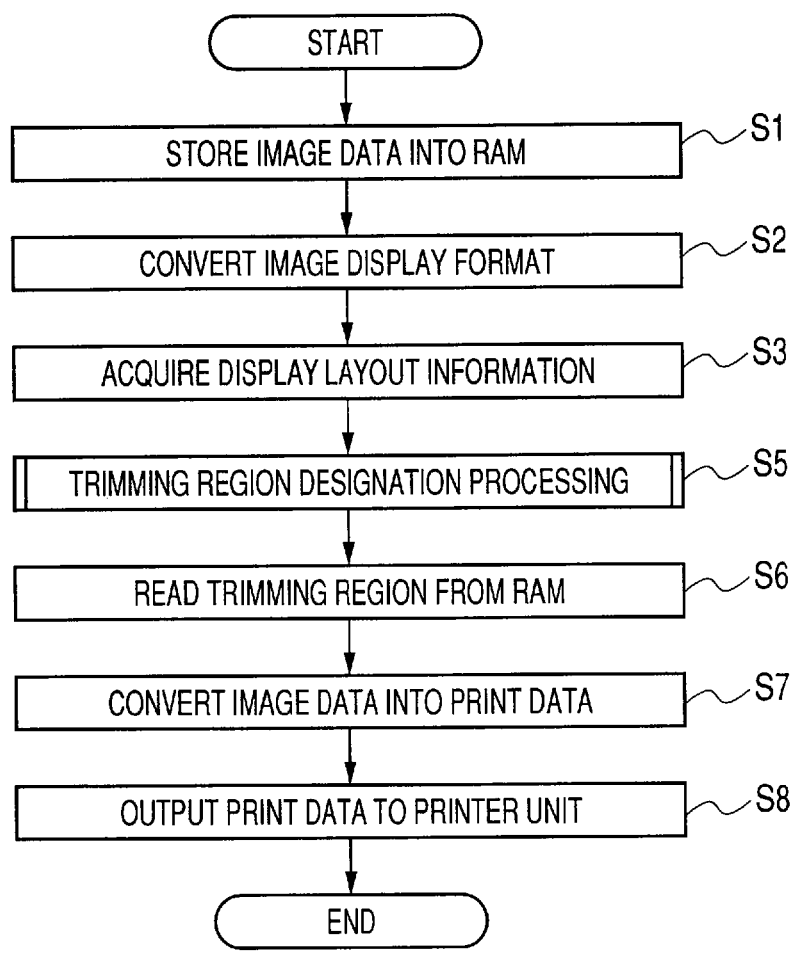
FIG. 4 is a flowchart showing main processing.

Image processing performed by means of the CPU 21 will now be described by reference to flowcharts shown in FIGS. 4 through 6. Image processing corresponds to processing for selecting image data falling within the region designated by the user from the original image data; and for performing processing operation, such as printing operation. FIG. 4 is a flowchart showing main processing corresponding to the general outline of image processing. First, the user specifies image data (original image data) to be edited. Desired image data can be selected from the image data received by the facsimile function and the image data stored in the card-type memory inserted in the slot unit 72.

The CPU 21 stores the selected image data into the original image memory 23a of the RAM 23 (S1). When the image data received by the facsimile function are edited, the image data stored in EEPROM 24 are transferred the RAM 23. When the image data are stored in the card-type memory inserted in the slot unit 72, the image data are transferred from the slot unit 72 to the RAM 23.

Next, these sets of image data differ from each other in terms of storage formats. Hence, the image data are converted into a format so that the image data can be displayed on the display screen (S2). Next, display layout information (a display configuration) is acquired (S3). The display layout information is used for displaying an image (an extracted image) based on a portion or the entirety of the image data extracted from the original image data in the trimming region designation area 411 shown in FIG. 3A. The information includes a location where an extracted image is to be displayed, a scaling factor for reduction, and the like and is stored in a predetermined area of the ROM 22.

Next, trimming region designation processing is performed (S5). Trimming region designation processing is performed for displaying an extracted image on the display screen and selecting an arbitrary region from the extracted image by the user moving the selection frame displayed on a portion of the extracted image. Details of trimming region designation processing will be described later by reference to FIGS. 5 and 6.

Subsequent to trimming region designation processing, the image data (selected image data) selected through trimming region designation processing are stored in the selected image memory 23b of the RAM 23. Hence, the image data are read from the selected image memory 23b (S6) and converted into print data (S7), and the print data are output to the printer unit 2 (S8). When a plurality of sets of selected image data are stored in the selected image memory 23b, the print data are created so that the lower end of an image based on selected image data to be output first and the upper end of an image originating from selected image data to be output next are printed in an essentially-matched manner, and the created data are output to the printer unit 2.

During conversion of print data, there is performed halftone processing for converting a color image into CMYK when data pertaining to the color image containing RGB and converting the CMYK data into data to be output on a per-print-dot basis. The print data are input to the printer unit 2 and printed on a predetermined recording sheet.

Trimming region designation processing will now be described with reference to FIG. 5. FIG. 5 is a flowchart showing trimming region designation processing. During trimming region designation processing, the user operates the cross-shaped key 40a, the ENTER key 40b or the stop key 40c to issue a command to designate a region or change the display configuration. Upon detection of the operation, the CPU 21 performs processing for changing a display on the display screen in accordance with the detected operation.

During trimming region designation processing, there are created display information for displaying an extracted image in the trimming region designation area 411 on the display screen and display information for displaying an enlarged image of a selected image in the area enclosed by the selection frame, in accordance with the first display configuration 410 corresponding to the display layout information acquired through processing pertaining to S3. The created display information is transmitted to the LCD controller 28. Upon receipt of the created display information, the LCD controller 28 provides a display on the display screen in accordance with the created display information. In the example of the first display configuration 410 shown in FIG. 3A, the original image data stored in the original image memory 23a are formed from image data of ten pages. Accordingly, image data are extracted from the image data on a per-page basis; display information of one page is created; and the created display information is displayed on the display screen as an extracted image. Therefore, when there is a command to change a page, another set of image data of one page is extracted from the original image data memory 23a, and the extracted image data is displayed in a switched manner on the display screen in accordance with the command.

The first page (an image based on the extracted image data) of the image data stored in the original image memory 23a is displayed in the trimming region designation area 411 of the first display configuration 410, and the selection frame is displayed concurrently. A distance between the upper and lower ends of this selection frame is constant, and the width of the frame is identical with the width of the extracted image. In an initial state where one page of the extracted image is displayed, the image is displayed so that the upper end of the selection frame coincides with the upper end of the image on the page.

The distance between the upper and lower ends of the selection frame is formed so that the aspect ratio containing the height and the width of the extracted image coincides with the aspect ratio of the display screen. The selected image in the area enclosed by the frame is enlarged and displayed within the trimming region confirmation area 412 (S10).

Next, the CPU 21 determines whether any one of right and left arrow keys, which are used for designating right or left, among four-way switches of the cross-shaped key 40a has been operated (S11). When any one of the right and left arrow keys has been operated (Yes is selected in S11), a page is changed in response to the operation of the right or left arrow key, and the specified page is displayed in the trimming region designation area 411 (S12). Specifically, when the left arrow key has been operated, a previous page is displayed. When the right arrow key has been operated, the next page is displayed. When a previous page is designated while a top page (preceded by no other pages) is displayed, the page may remain unchanged, or the last page may be displayed. In addition, when the next page is designated while a last page (not being followed by any other page) is displayed, the page may remain unchanged, or the top page may be displayed. In the example shown in FIG. 3A, the third page of the ten pages is displayed by means of these operations.

When processing pertaining to S12 has been completed, processing returns to S10. When determination processing pertaining to S11 shows that neither of the right and left arrow keys has been operated (No is selected in S11), the CPU 21 determines whether either one of up and down arrow keys among the four-way keys of the cross-shaped key 40a has been operated (S13). When the up or down arrow key has been operated (Yes is selected in S13), the selection frame is moved up or down in response to actuation of the up or down arrow key, and an image falling within the region designated by the selection frame is enlarged and displayed within the right-side trimming region confirmation area 412 (S14). When "UP" has been specified by the cross-shaped key 40a, the selection frame is moved upward. When "DOWN" has been specified by the cross-shaped key 40a, the selection frame is moved downward. When "UP" is specified with the upper end of the selection frame coinciding with the upper end of the extracted image, the selection frame is not moved. Similarly, when "DOWN" is specified with the lower end of the selection frame coinciding with the lower end of the extracted image, the selection frame is not moved.

When processing pertaining to S14 has been completed, processing returns to S10. Meanwhile, when determination processing pertaining to S13 shows that neither the up arrow key nor the down arrow key has been operated (No is selected in S13), the CPU 21 determines whether the ENTER key 40b has been operated (S15). When the ENTER key 40b has been operated (Yes is selected in S15), selected image data corresponding to the selected image falling within the region designated by the selection frame are stored in the selected image memory 23b of the RAM 23 (S16).

A plurality of sets of selected image data can be created by setting the selection frame at a plurality of locations. At that time, when the selected image data that are previously selected are stored in the selected image memory 23b, a selected image data that are newly selected are stored as being linked to the previously-stored selected image data on a per-frame basis. The expression "stored as being coupled on a per-frame basis" used herein means that the selected image data specified by the selection frame are stored as a single unit; namely, the selected image data are stored as a unit in a free space every time selection operation is performed. Newly-selected image data are not always stored in an address subsequent to the final address of the previously-stored selected image data.

When the printer unit 2 performs printing operation in accordance with the selected image data stored in the selected image memory 23b and when the size (A4-size, B5-size, etc.) of a recording sheet has been set in advance, the data are stored by specifying a page of that recording sheet.

When processing pertaining to S16 has been completed, the CPU 21 determines whether the ENTER key 40b has been operated (S17). When the ENTER key 40b has been operated (Yes is selected in S17), a continuous selection confirmation display indicating it is in a condition to continuously select an image is provided (S18). The CPU 21 determines whether a blank space (hereinafter referred to as a "recordable area") in a page currently designated at the time of printing of a selected image is equal to or greater than an area where the image selected by the currently-set selection frame can be printed (S19). When the recordable area is equal to or greater than the area where the image selected by the currently-set selection frame can be printed, the continuous selection confirmation display indicating the ability to perform continuous selection is provided (S20), and processing returns to S10.

Meanwhile, when the recordable area is smaller than the area where the image selected by the currently-set selection frame can be printed (No is selected in S19), the size of the selection frame is reset to an area where the image selected by the currently-set selection frame can be printed (S21). A display complying with the fifth display configuration 450 is provided, and processing returns to S1. Now, when the recordable area is smaller than a predetermined size, the next selected image may be printed on the next page without changing the size of the selection frame.

Figure 5:
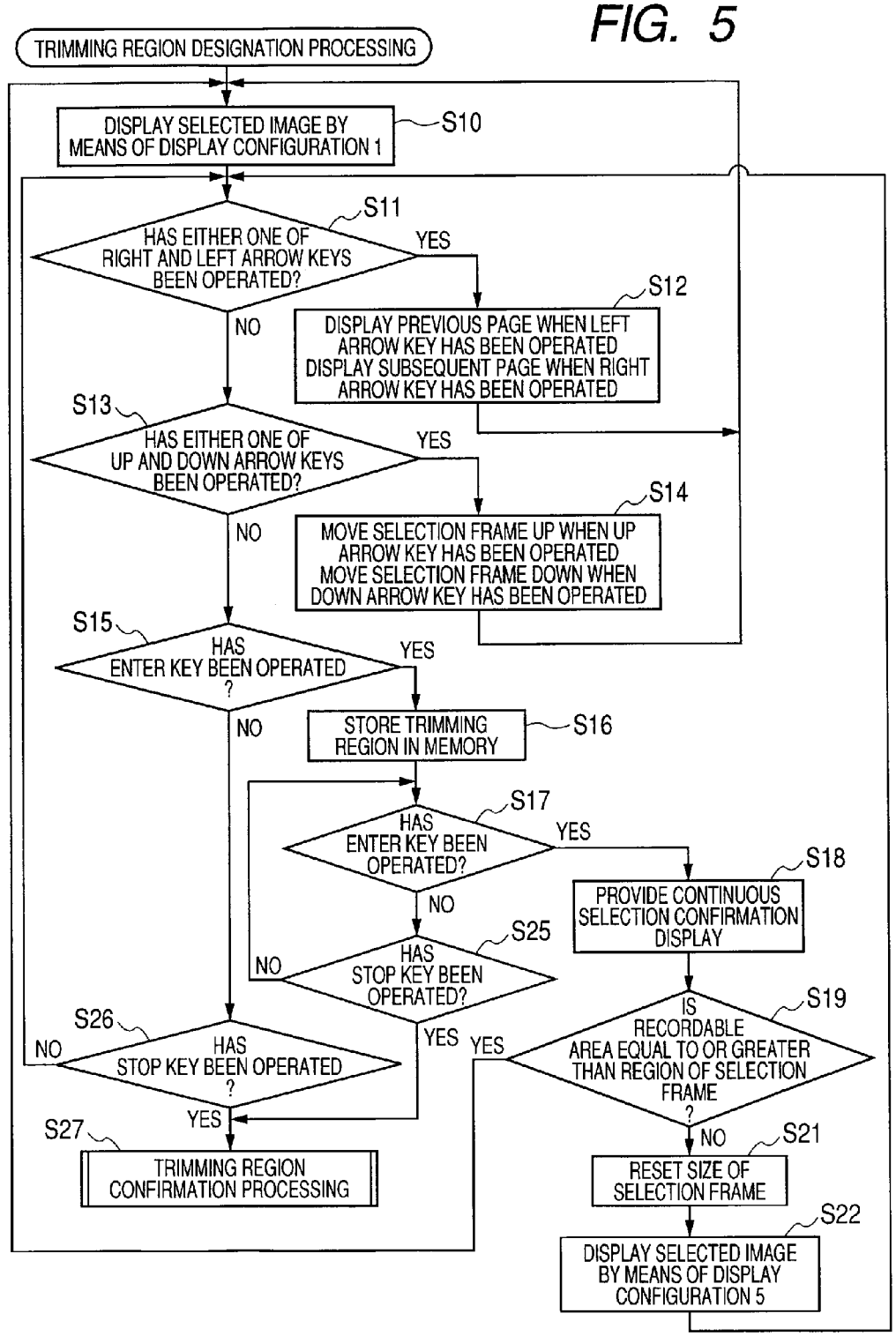
FIG. 5 is a flowchart showing trimming region designation processing.
Figure 6:
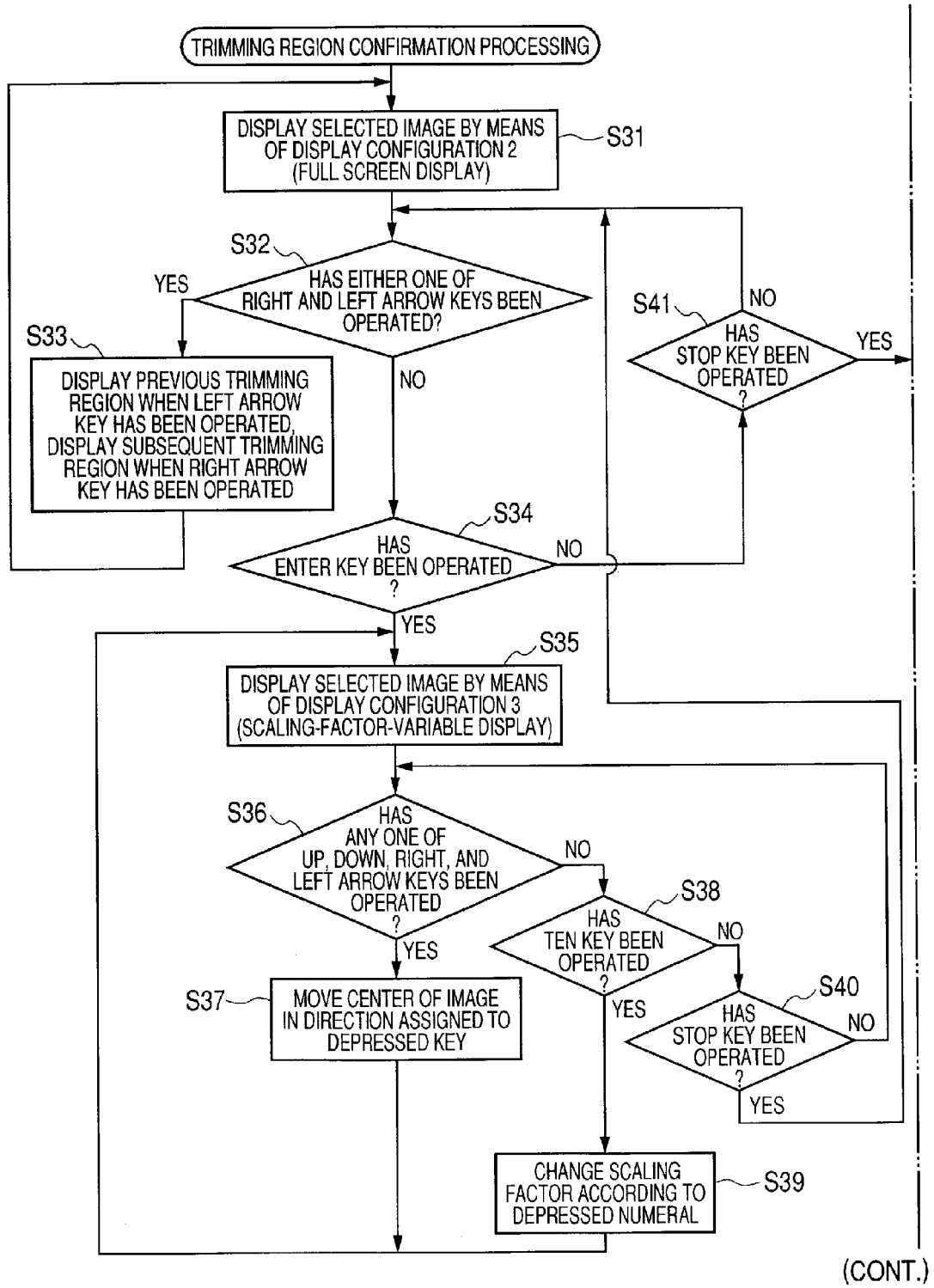
FIG. 6 is a flowchart showing trimming region confirmation processing.

Although not described in the flowchart shown in FIG. 5 for the sake of simplicity of explanations, when the size of the selection frame has been changed and a final image to be printed on that page has been selected, the selection frame is resized to its original size so as to sequentially select an image to be printed on the next page.

In S17, when the ENTER key 40b has not been operated (No is selected in S17), the CPU 21 determines whether the stop key 40c has been operated (S25). When the stop key 40c has not been operated (No is selected in S25), processing returns to S17. When the stop key 40c has been operated (Yes is selected in S25), trimming region confirmation processing is performed (S27).

In S15, when the ENTER key 40b has not been operated (No is selected in S15), a determination is made as to whether or not the stop key 40c has been operated (S26). When the stop key 40c has not been operated (No is selected in S26), processing returns to S11. When the stop key 40c has been operated (Yes is selected in S26), trimming region confirmation processing is performed (S27).

Trimming region confirmation processing will now be described with reference to FIG. 6. FIG. 6 is a flowchart showing trimming region confirmation processing. During trimming region confirmation processing, the selected image designated through trimming region designation processing is confirmed by means of a full-screen display.

First, the image selected this time by means of the selection frame is displayed over the entire display screen as indicated by the second display configuration 420 (S31). Next, the CPU 21 determines whether either one of the right and left arrow keys among the four-way keys of the cross-shaped key 40a has been operated (S32). When any one of the right and left arrow keys has been operated (Yes is selected in S32), an image in the trimming region displayed on the display screen is changed. Specifically, when the left arrow key has been operated, the image selected before the currently-displayed selected image is displayed. When the right arrow key has been operated, an image selected subsequent to the currently-displayed selected image is displayed (S33). However, when selected image data corresponding to a selected image data are not stored in the selected image memory 23b despite the operation of the left or right arrow key, a display is not changed. When processing pertaining to S33 is completed, processing returns to S31.

In S32, when neither the right arrow key nor the left arrow key has been operated (No is selected in S32), the CPU 21 determines whether the ENTER key 40b has been operated (S34). When the ENTER key 40b has been operated (Yes is selected in S32), a display is provided on the display screen by means of the third display configuration 430. Scrolling the displayed image and setting a display scaling factor can be respectively made by operating the cross-shaped key 40a and the ten-key 40d while the display in accordance with the third display configuration 430 is being provided.

The CPU 21 determines whether the cross-shaped key (any one of the up, down, right, and left arrow keys) 40a has been operated (S36). When the cross-shaped key 40a has been operated, information used for moving the center position of an image is set so as to scroll the image and change the location of the image (S37), and processing returns to S35.

When the cross-shaped key (any one of the up, down, right, and left arrow keys) 40a has not been operated (No is selected in S36), the CPU 21 determines whether the display scaling factor has been set by means of the ten-key 40d (S38). When the display scaling factor has been set (Yes is selected in S38) to change the display scaling factor, a re-display according to the third display configuration 430 based on the changed display scaling factor is provided (S31). When the display scaling factor is not set (No is selected in S38), the CPU 21 determines whether the stop key 40c has been operated (S40). When the stop key 40c has been operated (Yes is selected in S40), processing returns to S32. When the stop key 40c has not been operated (No is selected in S40), processing returns to S36.

Meanwhile, in S34, the ENTER key 40b has not have been operated, the CPU 21 determines whether the stop key 40c has been operated (S41). When the stop key 40c has not been operated (No is selected in S41), processing returns to S32. When the stop key 40c has been operated (Yes is selected in S41), there is provided an additional trimming region confirmation display for displaying a message that a selection can be made whether to proceed to a mode for designating an additional trimming region by depression of the ENTER key 40b or to proceed to a mode for confirming a recording result by depression of the stop key 40c. First, the CPU 21 determines whether the ENTER key 40b has been operated (S43). When the ENTER key 40b has been operated, processing returns to S10 (see FIG. 5).

When the ENTER key 40b has not been operated, the CPU 21 determines whether the stop key 40c has been operated (S44). When the stop key 40c has not been operated (No is selected in S44), processing returns to S43. When the stop key 40c has been operated (Yes is selected in S44), a display is provided on the display screen according to the fourth display configuration 440 (S45). In the fourth display configuration 440, when selected images are printed, a plurality of selected images to be printed on each of pages are displayed on a per-recording-sheet-basis, as mentioned previously. As a result, the user can confirm a recording image achieved when a plurality of selected images are printed in a linked manner.

First, the CPU 21 determines whether either one of the up and down arrow keys, which are used for designating up or down, among the four-way switches of the cross-shaped key 40a has been operated (S46). When the up or down arrow key has been operated (Yes is selected in S46), a page to be printed is changed and specified (S47), and processing returns to S45.

In detail, when the up arrow key has been operated, a previous page is displayed. When the down arrow key has been operated, the next page is displayed.

When neither the up arrow key nor the down arrow key has been operated (No is selected in S46), the CPU 21 determines whether either one of the right and left arrow keys among the four-way switches of the cross-shaped key 40a has been operated (S48). When the right or left arrow key has been operated (Yes is selected in S48), a designated selected image (a trimming region) among the plurality of displayed selected images is changed. When the left arrow key has been operated, a selected image preceding the currently-designated selected image is specified. When the right arrow key has been operated, the selected image subsequent to the currently-specified selected image is specified (S49). In the example shown in FIG. 3D, triangular icons are displayed at positions above and below a specified selected image so as to enable distinction of the specified selected image. Arrow icons may also be displayed in lieu of the triangular icons. In addition, a display may also be provided such that a display mode (e.g., a display color, a background color, hatching, etc.) of the specified selected image differs from a display mode of remaining selected images. When processing pertaining to S49 has been completed, processing returns to S45.

When neither the right arrow key nor the left arrow key has been operated (No is selected in S48), the CPU 21 determines whether the DELETE key 40e has been operated (S50). When the DELETE key 40e has been operated (Yes is selected in S50), selected image data corresponding to the currently-designated selected image (designated through processing pertaining to S49) are deleted from the selected image memory 23b (S51). When processing pertaining to S51 has been completed, processing returns to S45. When one of the selected images has been deleted, the selected image subsequent to that deleted image is designated. Further, the selected image of a page is diminished. Accordingly, when a selected image remains stored in the next page, the selected image located at the top of that page may be moved to the rear end of the page from which the image has been deleted.

When the DELETE key 40e has not been operated (No is selected in S50), the CPU 21 determines whether the ENTER key 40b has been operated (S52). When the ENTER key 40b has been operated (Yes is selected in S52), trimming region designation processing is completed, and processing proceeds to S6 (see FIG. 4). When the ENTER key 40b has not been operated (No is selected in S52), processing returns to S46.

The apparatus may also be configured so as to return to processing pertaining to S42 rather than to processing pertaining to S46, thereby again designating a selected image. Alternatively, the apparatus may also be configuration such that the user can select whether to return to processing pertaining to S46 or to processing pertaining to S42.

According to the first embodiment as described above, the extracted image and the selection frame are displayed on the display screen. The selection frame having a constant distance between the upper and lower ends is moved to an arbitrary position. Thereby, image data corresponding to the image falling within the trimming region enclosed by the selection frame are stored in the selected image memory 23b of the RAM 23.

The extracted image is displayed in the trimming region designation area 411 on the left side of the display screen, and the user designates an arbitrary trimming region in the extracted image. A selected image based on the image data falling within the designated trimming region is enlarged and displayed within the trimming region confirmation area 412 on the right side of the display screen. The selected image displayed in the trimming region confirmation area 412 can be displayed over the entire display screen, further enlarged or scrolled, under a command from the user.

In relation to most of the images based on the image data received by the facsimile function or the like, designating a region by means of the upper and lower ends of an image to be selected is sufficient, and there is no necessity for designating a horizontal (sideways) region. Therefore, in the present embodiment, the user is allowed to designate only the upper and lower ends of a region for selecting an image, and the right and left ends of the region are configured so as to coincide with the right and left ends of a rectangular image. Operation to be performed by the user can be simplified by means of omitting operation for designating the right and left ends of the region. Further, an indicator for specifying the upper and lower ends is configured to be moved by a single key operation while a predetermined distance is retained. As a result, the user does not need to perform operation for individually specifying the upper and lower ends. As a result of the region of an image being designated as mentioned above, the user can choose to limit printing to only a required portion of the received image data. A time required for printing can be shortened, and consumption of a material required for printing, such as ink, can be curtailed.

A second embodiment will now be described with reference to FIG. 7. The second embodiment is a modification of trimming region designation processing of the first embodiment. A flowchart shown in FIG. 7 includes a change in a part of the flowchart shown in FIG. 5. Unchanged steps are assigned to the same step numbers, and their repeated explanations are omitted.

In the first embodiment, when selected image data have already been stored in the selected image memory 23b as a result of a selection, and then another selection is performed, i.e., when the ENTER key 40b has been operated in S18 of the flowchart shown in FIG. 5, a recordable region is compared with a region where the image selected by the selection frame is to be printed (S19). When the recordable region is smaller (No is selected in S19), the selection frame is changed to a smaller size (S21).

In contrast, in the second embodiment, the size of the selection frame is not changed, and a new image is selected. When the selected image is output while remaining linked to the previously-selected image, the image may not fall within a single recording sheet and is printed over the next recording sheet. In such a case, the user is provided with a display to the effect that an image will be printed over the next page.

In S19 shown in FIG. 7, the recordable region is compared with the region where an image selected by the selection frame is to be printed. When the recordable region is small (No is selected in S19), there is provided a display to the effect that the recording sheet comes to the next page (S24), and processing returns to S10. Next, when an image to be selected has been specified by use of the selection frame, the image is to be printed on the next page through processing pertaining to S16, and the image is stored in the selected image memory 23b.

The configuration may also be provided so as to enable the user to select at his discretion, after display of a message showing that a new selection region is printed on the next page, whether to abort designation of a new selection region or to reduce an entire image so as to fall within one recording sheet while to be linked as a new selection region.

The first and second embodiments have described that the size of the selection frame corresponds to the aspect ratio of the display screen. However, when a print sheet on which a selected image is to be printed has been set, a distance between the upper and lower ends of the selection frame may also be set to a distance corresponding to a length determined by equally dividing the length of the print sheet by "n" (an integer equal to two or more). Specifically, an aspect ratio achieved when one is selected from sub-divisions made by equally dividing the length of the print sheet by "n" is made equal to the aspect ratio of the selection frame, and the size of the selection frame is set so that the width of the selection frame corresponds to the width of a displayed image.

Thus, "n" images trimmed by the selection frame can be printed on one page of the print sheet. There is no necessity to perform adjustment for leaving blank spaces or changing the size of the selection frame, and printing can be performed efficiently.

An image display unit, an indicator display unit, an image display step, and an indicator display step correspond to processing pertaining to S10 of the flowchart shown in FIG. 5. A deciding unit and a deciding step correspond to processing selected Yes in S15 of the flowchart shown in FIG. 5. A selection unit, a storage control unit, a selection step, and a storage control step correspond to processing pertaining to S16 of the flowchart shown in FIG. 5. An output unit corresponds to processing pertaining to S8 of the flowchart shown in FIG. 4. A selected image display unit corresponds to processing pertaining to S31 of the flowchart shown in FIG. 6. An enlarged image display unit corresponds to an area to be enlarged in a trimming region enlarging area on the right side of the display screen during processing pertaining to S14 shown in FIG. 5. An indicator change unit corresponds to processing pertaining to S21 of the flowchart shown in FIG. 5. A report unit corresponds to processing pertaining to S24 of the flowchart shown in FIG. 7.

Although the present invention has been described in connection with the embodiments, the present invention is not limited to the embodiments. It can be readily inferred that the present invention is liable to various modifications within the scope of the present invention.

Although processing performed by the multifunction peripheral device has been described in connection with the embodiments, processing may be performed by a single-function machine, such as a printer, a facsimile, etc.

In the present embodiment, data received by the facsimile are subjected to trimming. However, trimming may also be applied to data input by way of a computer or the like.

The right and left ends of an image to be selected correspond to and is fixed to right and left ends of a rectangular image based on the image data extracted from the original image data. Therefore, the right and left ends do not always need to be displayed on the display screen as in the case of the selection frame described in connection with the embodiment. Consequently, an arrow designating an upper end and another arrow designating a lower end may also be displayed as indicators in the vicinity of the displayed image. A vertical distance of the selection frame may also be made constant, and the selection frame may be moved through key operation, thereby designating an image region. Alternatively, a pair of straight lines which are shorter than the width of the displayed image may also be displayed in a movable manner as indicators.

In the first embodiment, the selected image is displayed in a further enlarged state over the entire screen during trimming region confirmation processing and scrolled. However, the upper and lower ends of the trimming region may also be changed in this entire screen display. Moreover, before a selected image once determined in the first display configuration 410 is brought into trimming region confirmation processing, the upper and lower positions of the selection region can also be finely adjusted through key operation.

In the present embodiment, the trimmed image is output as being printed by the printer unit 2. However, the trimmed image may also be output to a computer or transmitted by means of a facsimile function.

The above embodiment describes the configuration for extracting image data from original image data on a per-page basis and displaying the extracted image data on the display screen. However, the unit at which image data are extracted is not limited to a per-page basis. Any unit may be employed, so long as image data are output as a rectangular image. For instance, portions may be extracted from image data corresponding to one page, and the extracted images may be sequentially displayed as a displayed image. Further, there is no need to display the entirety of one page from the right end to the left end thereof.

What is claimed is:

1. An image processing apparatus comprising:
   a key operation unit having a plurality of keys;
   a display screen comprising a first area and a second area;
   an image storage unit that stores image data;
   a processor; and
   memory storing computer readable instructions, when executed by the processor, causing the image processing apparatus to:
   display at least a part of an image that is based on the image data stored in the image storage unit, the image having a quadrilateral shape defined by a first pair of parallel sides and a second pair of parallel sides;
   display an indicator for specifying a first selection region with respect to the image displayed on the display screen, the first selection region within the image having a quadrilateral shape defined by a third pair of parallel sides and a fourth pair of parallel sides, the third pair and the fourth pair being substantially in parallel with the first pair and the second pair, respectively, the indicator defining the first selection region by indicating positions of the third pair of parallel sides, and the indicator display unit configured to display the indicator, such that the indicator moves in a direction parallel to the second pair of parallel sides based on an input entered from the key operation unit while the third pair of parallel sides is retained at a predetermined distance from each other;
   decide the position of the indicator for determining a position of the first selection region;
   determine a first position of the third pair of parallel sides in accordance with the decided position of the indicator and a second position of the fourth pair of parallel sides to substantially coincide with the second pair of parallel sides of the image;
   select first image data corresponding to a region defined by the first position and the second position as first selected image data;
   display the first selected image based on the first selected image data on the second area, wherein the first selected image is enlarged with a scaling factor greater than the image displayed on the first area;
   store the first selected image data in the image storing unit;
   select second image data corresponding to a second selection region determined based on a second selection region within the image specified by the position of the indicator as second selected image data;
   change the position of the indicator when a blank space of the recording medium left as a result of a first selected image based on the first selected image data stored in the image storage unit to be printed is smaller than an area for the second selected image data, wherein the position of the indicator is changed so that the position of the indicator corresponds to the third pair of the parallel sides of the second selection region to shorten a distance between the sides of the third pair of parallel sides of the second selection region to be disposed within the blank space;

store the second selected image data determined based on the second selection region specified by the changed position of the indicator in the image storing unit; and print an image based on the first and second selected image data stored in the image storing unit on a recording medium, wherein the indicator for specifying the selection region within the image is movable within the image on the display screen without moving a portion of the image in the selection region, wherein the selected image based on the selected image data and the indicator are displayed on the first area of the display screen, and wherein the selected image, of which the selection region is specified by the indicator, and the enlarged image are simultaneously displayed on the first area and the second area, respectively.

2. The image processing apparatus according to claim 1, the computer readable instructions, when executed by the processor, further causing the image processing apparatus to:
display the image entirely with respect to a direction parallel to the first pair of the parallel sides; and
display a frame having a quadrilateral shape whose length is previously set to be less than a distance between the first pair of parallel sides of the image and whose width is set to equal to a distance between the second pair of parallel sides of the image,
wherein the frame is displayed at a position at which sides defining the width of the frame substantially coincide with the second pair of the parallel sides of the image.

3. The image processing apparatus according to claim 2, wherein the image is displayed as an entire image based on the image data equivalent to one page.

4. The image processing apparatus according to claim 1, the computer readable instructions, when executed by the processor, further causing the image processing apparatus to:
store a next selected image data to be selected followed by a previously-stored selected image data, when a plurality of sets of image data are selected.

5. The image processing apparatus according to claim 1, wherein the first pair of the parallel sides extends in a horizontal direction to define an upper end and a lower end of the image, and the second pair of the parallel sides extend in a vertical direction to define a left end and a right end of the image.

6. The image processing apparatus according to claim 5, the computer readable instructions, when executed by the processor, further causing the image processing apparatus to:
output a selected image based on a next selected image data so that an upper end of the next selected image is fitted to a lower end of a selected image based on a previously-selected image data, when a plurality of sets of image data are selected.

7. The image processing apparatus according to claim 6, the computer readable instructions, when executed by the processor, further causing the image processing apparatus to:
display a plurality of selected images on the display screen in accordance with an input entered from the key operation unit.

8. The image processing apparatus according to claim 7, the computer readable instructions, when executed by the processor, further causing the image processing apparatus to:
print the selected images on a recording medium, and
display a preview image corresponding to the selected images to be printed on the recording medium on a per-page basis.

9. The image processing apparatus according to claim 1, the computer readable instructions, when executed by the processor, further causing the image processing apparatus to:
display only the selected image on the display screen in accordance with an input entered from the key operation unit.

10. The image processing apparatus according to claim 9, the computer readable instructions, when executed by the processor, further causing the image processing apparatus to:
scroll a display of the selected image in accordance with an input entered from the key operation unit when a part of the selected image displayed by the selected image display unit is not displayed on the display screen.

11. The image processing apparatus according to claim 9, wherein the key operation unit includes a display scaling factor setting unit configured to set a display scaling factor, and
wherein the selected image is enlarged at the display scaling factor set by the display scaling factor setting unit.

12. The image processing apparatus according to claim 1, the computer readable instructions, when executed by the processor, further causing the image processing apparatus to:
print the selected image on a recording medium based on the stored selected image data; and
report that a selected image based on image data next selected is printed on a subsequent page of the recording medium, when a blank space of the recording medium left as a result of the selected image based on the selected image data having been stored to be printed on the recording medium is less than an area to be printed for the next selected image data.

13. The image processing apparatus according to claim 1, the computer readable instructions, when executed by the processor, further causing the image processing apparatus to:
print a selected image on a recording medium based on the stored selected image data,
wherein the distance between the third pair of parallel sides of the selection region is set to correspond to a length determined by equally dividing the recording medium in a longitudinal direction by n, wherein n is an integer equal to two or more.

14. The image processing apparatus according to claim 13, the computer readable instructions, when executed by the processor, further causing the image processing apparatus to:
display only the selected image on the display screen in accordance with an input entered from the key operation unit wherein the display screen has a rectangular shape,
wherein the selected image is displayed so that a width of the selected image is fitted to a width of the display screen,
wherein a value of n is set so that, when the selected image is displayed on the display screen, a height of the selected image becomes less than a height of the display screen.

15. The image processing apparatus according to claim 1, wherein the display screen has a rectangular shape having a first aspect ratio,
wherein the selection region has a second aspect ratio that is defined based on the first aspect ratio.

16. A computer program product for enabling a computer to control an image processing apparatus including a key operation unit having a plurality of keys, a display screen comprising a first area and a second area, and an image storage unit that stores image data, the program product comprising:
- software instructions for enabling the computer to perform an image processing, and
- a non-transitory computer readable medium bearing the software instructions,
- the image processing operation including the steps of:
  - displaying at least a part of an image that is based on the image data stored in the image storage unit on the display screen, the image having a quadrilateral shape defined by a first pair of parallel sides and a second pair of parallel sides;
  - displaying an indicator for specifying a first selection region with respect to the image displayed on the display screen, the first selection region within the image having a quadrilateral shape defined by a third pair of parallel sides and a fourth pair of parallel sides, the third pair of parallel sides and the fourth pair of parallel sides being substantially in parallel with the first pair of parallel sides and the second pair of parallel sides, respectively, the indicator defining the first selection region by indicating positions of the third pair of parallel sides, and displaying the indicator, such that the indicator moves in a direction parallel to the second pair of parallel sides based on a input entered from the key operation unit while the third pair of parallel sides is retained at a predetermined distance from each other;
  - deciding the position of the indicator;
  - determining a first position of the third pair of parallel sides in accordance with the decided position of the indicator and a second position of the fourth pair of parallel sides to substantially coincide with the second pair of parallel sides of the image, and selecting first image data corresponding to a region defined by the first position and the second position as first selected image data;
  - displaying the first selected image based on the first selected image data on the second area, wherein the first selected image is enlarged with a scaling factor greater than the image displayed on the first area;
  - storing the first selected image data in the image storing unit;
  - selecting second image data corresponding to a second selection region determined based on a second selection region within the image specified by the position of the indicator as second selected image data;
  - changing the position of the indicator when a blank space of the recording medium left as a result of a first selected image based on the first selected image data stored in the selected image storage unit to be printed is smaller than an area for the second selected image data, wherein the position of the indicator is changed so that the position of indicator corresponds to the third pair of the parallel sides of the second selection region to shorten a distance between the sides of the third pair of parallel sides of the second selection region to be disposed within the blank space;
  - storing the second selected image data determined based on the second selection region specified by the changed position of the indicator in the image storing unit; and
  - printing an image based on the first and second selected image data stored in the image storing unit on a recording medium,
- wherein the indicator for specifying the selection region within the image is movable within the image on the display screen without moving a portion of the image in the selection region,
- wherein the selected image based on the selected image data and the indicator are displayed on the first area of the display screen, and
- wherein the selected image, of which the selection region is specified by the indicator, and the enlarged image are simultaneously displayed on the first area and the second area, respectively.

* * * * *